(12) United States Patent
Battiato

(10) Patent No.: US 12,128,745 B2
(45) Date of Patent: Oct. 29, 2024

(54) SYSTEM AND METHOD OF TAILGATE TO TRUCK BED SEALING TO PREVENT DEBRIS FROM FALLING INTO AND LODGING IN A GAP BETWEEN A TAILGATE AND A TRUCK BED

(71) Applicant: Victor J. Battiato, West Chicago, IL (US)

(72) Inventor: Victor J. Battiato, West Chicago, IL (US)

( * ) Notice: Subject to any disclaimer, the term of this patent is extended or adjusted under 35 U.S.C. 154(b) by 84 days.

(21) Appl. No.: 17/527,140

(22) Filed: Nov. 15, 2021

(65) Prior Publication Data

US 2022/0072939 A1 Mar. 10, 2022

Related U.S. Application Data

(63) Continuation-in-part of application No. 16/161,476, filed on Oct. 16, 2018, now abandoned, which is a continuation-in-part of application No. 15/598,276, filed on May 17, 2017, now Pat. No. 10,099,544, which is a continuation-in-part of application No. 14/705,839, filed on May 6, 2015, now abandoned.

(60) Provisional application No. 62/746,124, filed on Oct. 16, 2018, provisional application No. 61/992,898, filed on May 14, 2014.

(51) Int. Cl.
| | |
|---|---|
| *B60J 10/84* | (2016.01) |
| *B60J 10/24* | (2016.01) |
| *B60J 10/27* | (2016.01) |
| *B60J 10/34* | (2016.01) |
| *B62D 33/027* | (2006.01) |

(52) U.S. Cl.
CPC ............... *B60J 10/84* (2016.02); *B60J 10/24* (2016.02); *B60J 10/27* (2016.02); *B60J 10/34* (2016.02); *B62D 33/0273* (2013.01)

(58) Field of Classification Search
CPC ....... B62D 33/0273; B60J 10/34; B60J 10/24; B60J 10/27; B60J 10/84
See application file for complete search history.

(56) References Cited

U.S. PATENT DOCUMENTS

| | | | | |
|---|---|---|---|---|
| 2,705,655 | A * | 4/1955 | Flemming | B60J 10/27 49/495.1 |
| 3,544,155 | A * | 12/1970 | Gardner | B62D 33/0273 296/57.1 |
| 4,111,481 | A * | 9/1978 | Nix | B60R 13/01 220/23.9 |
| 4,232,081 | A * | 11/1980 | Pullan | B60J 10/27 52/312 |
| 4,341,412 | A * | 7/1982 | Wayne | B60R 13/01 296/39.2 |
| 4,763,945 | A * | 8/1988 | Murray | B60R 13/01 296/57.1 |
| 5,011,163 | A * | 4/1991 | Hermann | B60J 10/26 277/653 |

(Continued)

*Primary Examiner* — Justin B Rephann
(74) *Attorney, Agent, or Firm* — Paul B. Heynssens; ATTORNEY AT LAW PLC

(57) ABSTRACT

The tail gate seal or debris blocking device includes a flap, with adhesive backed fastening tape disposed on a bottom side along each edge of the flap. The adhesive backed fastening tape couples the flap to the tail gate, and in an alternate example allows the tail gate to be removed by disengaging two halves of a removable fastening device that are removably coupled together.

9 Claims, 12 Drawing Sheets

200 Thin seal

(56) References Cited

U.S. PATENT DOCUMENTS

| | | | | |
|---|---|---|---|---|
| 5,664,822 | A * | 9/1997 | Rosenfield | B62D 25/2054 16/250 |
| 5,887,931 | A * | 3/1999 | Bills | B60R 13/01 40/616 |
| 6,287,669 | B1 * | 9/2001 | George | B60R 13/04 277/654 |
| 6,336,640 | B1 * | 1/2002 | Knapp | F16L 25/0036 277/606 |
| 6,474,654 | B1 * | 11/2002 | Schmeichel | B60J 10/34 277/645 |
| 6,485,030 | B1 * | 11/2002 | Hahn | B60J 10/15 277/645 |
| 8,172,309 | B1 * | 5/2012 | Weir | B32B 1/00 296/183.1 |
| 8,459,716 | B2 * | 6/2013 | Kaplan | B62D 33/0273 52/459 |
| 8,668,240 | B2 * | 3/2014 | Elliott | B62D 33/0273 296/57.1 |
| 9,016,753 | B2 * | 4/2015 | McDermott, III | B62D 33/0273 296/57.1 |
| 9,016,764 | B2 * | 4/2015 | Johnson | B62D 33/0273 296/183.1 |
| 9,316,044 | B2 * | 4/2016 | Hemphill | B62D 33/0273 |
| 10,611,317 | B2 * | 4/2020 | Smith | B62D 33/0273 |
| 11,142,136 | B2 * | 10/2021 | Deshpande | B62D 33/0273 |
| 2003/0121211 | A1 * | 7/2003 | Hashimoto | B60J 10/00 49/495.1 |
| 2006/0143988 | A1 * | 7/2006 | Dillmann | B60J 10/248 49/498.1 |
| 2011/0080017 | A1 * | 4/2011 | Olson | B60R 13/06 296/57.1 |
| 2011/0088225 | A1 * | 4/2011 | Fernandez | A44B 18/0069 24/450 |
| 2012/0159857 | A1 * | 6/2012 | Kaplan | B62D 33/0273 49/465 |
| 2012/0200104 | A1 * | 8/2012 | Olson | B62D 25/2054 296/1.06 |
| 2012/0222357 | A1 * | 9/2012 | Elliott | B62D 33/0273 49/383 |
| 2015/0084361 | A1 * | 3/2015 | McDermott, III | B62D 33/0273 296/57.1 |
| 2015/0344082 | A1 * | 12/2015 | Keklak | B62D 33/0273 16/250 |
| 2016/0221515 | A1 * | 8/2016 | Burd | B60J 10/84 |
| 2019/0322225 | A1 * | 10/2019 | Smith | B62D 33/0273 |

* cited by examiner though the present examples are described and illustrated herein as being implemented in a pickup truck bed, the system described is provided as an example and not a limitation. As those skilled in the art will appreciate, the present examples are suitable for application in a variety of different types of orifice sealing applications.

SYSTEM AND METHOD OF TAILGATE TO TRUCK BED SEALING TO PREVENT DEBRIS FROM FALLING INTO AND LODGING IN A GAP BETWEEN A TAILGATE AND A TRUCK BED

CROSS-REFERENCE TO RELATED APPLICATION

This application is a continuation in part of U.S. patent application Ser. No. 16/161,476 filed Oct. 16, 2018 which claims the benefit of US. Provisional Patent Application No. 61/62/746,124, filed Oct. 16, 2018. U.S. patent application Ser. No. 16/161,476 is a continuation in part of U.S. patent application Ser. No. 15/598,276 filed on May 17, 2017, now U.S. Pat. No. 10,099,544 which is a continuation in part of U.S. patent application Ser. No. 14/705,839 filed May 6 2015 now abandoned. U.S. patent application Ser. No. 14/705,839 claims the benefit of U.S. Provisional Patent Application No. 61/992,898, filed May 14, 2014, the disclosure all of which are incorporated herein by reference.

TECHNICAL FIELD

This description relates generally to truck beds or boxes and more particularly to sealing between a tailgate and the bed or box of pickup trucks.

BACKGROUND

The bed of pickup trucks is often lined with spray on coatings to protect the metal surface from scratches and to protect the cargo from damage. Additionally, some truck beds are covered with a flexible or ridged cap, or tonneau cover. This cap or cover also protects the cargo from environmental damage and theft.

Also in pickup trucks there is typically a tail gate that allows access to the truck box. The gate typically folds down and may be removable. When loose material like dirt, rocks and the like in a truck box are unloaded the gate is lowered and the materials are unloaded. There is typically a crack between the truck bed and the folded down tail gate. During unloading the rocks and material can fall in the crack where they are hard to remove and can jam the gate, as many people tend not to take the time to remove the gate before unloading. Also the material tend to fall through the crack and accumulate on the bumper or fall to the ground below where they make a mess that usually has to be swept, or shoveled up. Accordingly, it would be desirable to be able to prevent materials from entering the crack, and still allow tail gates to be easily removed.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified for as a prelude to the more detailed description that is presented later.

The tail gate seal or debris blocking device includes a resilient and flexible flap, with adhesive backed flexible fastening tape disposed on a bottom side of the flap. The adhesive backed fastening tape couples the flap to the tail gate and the bed. An alternative example allows the tail gate to be removed by disengaging the two halves of a tape that are removably coupled together. The debris blocking device may be also used, and supplied in tandem with a taper seal device, to seal the gate against the bed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a tailgate seal with taper seal. Although the present examples are described and illustrated herein as being implemented in a pickup truck bed, the system described is provided as an example and not a limitation. As those skilled in the art will appreciate, the present examples are suitable for application in a variety of different types of orifice sealing applications.

The tailgate seal with taper seal provides a seal that prevents the infiltration of dirt, rain, fumes, and the like from penetrating into a vehicle. The taper seal portion of the tailgate seal allows for use of one material where the gap to be sealed may be of a multitude of widths. Although dimensions are shown in some of the figures that follow, they are meant to be exemplary and are not intended to be a limitation.

Figure 1:
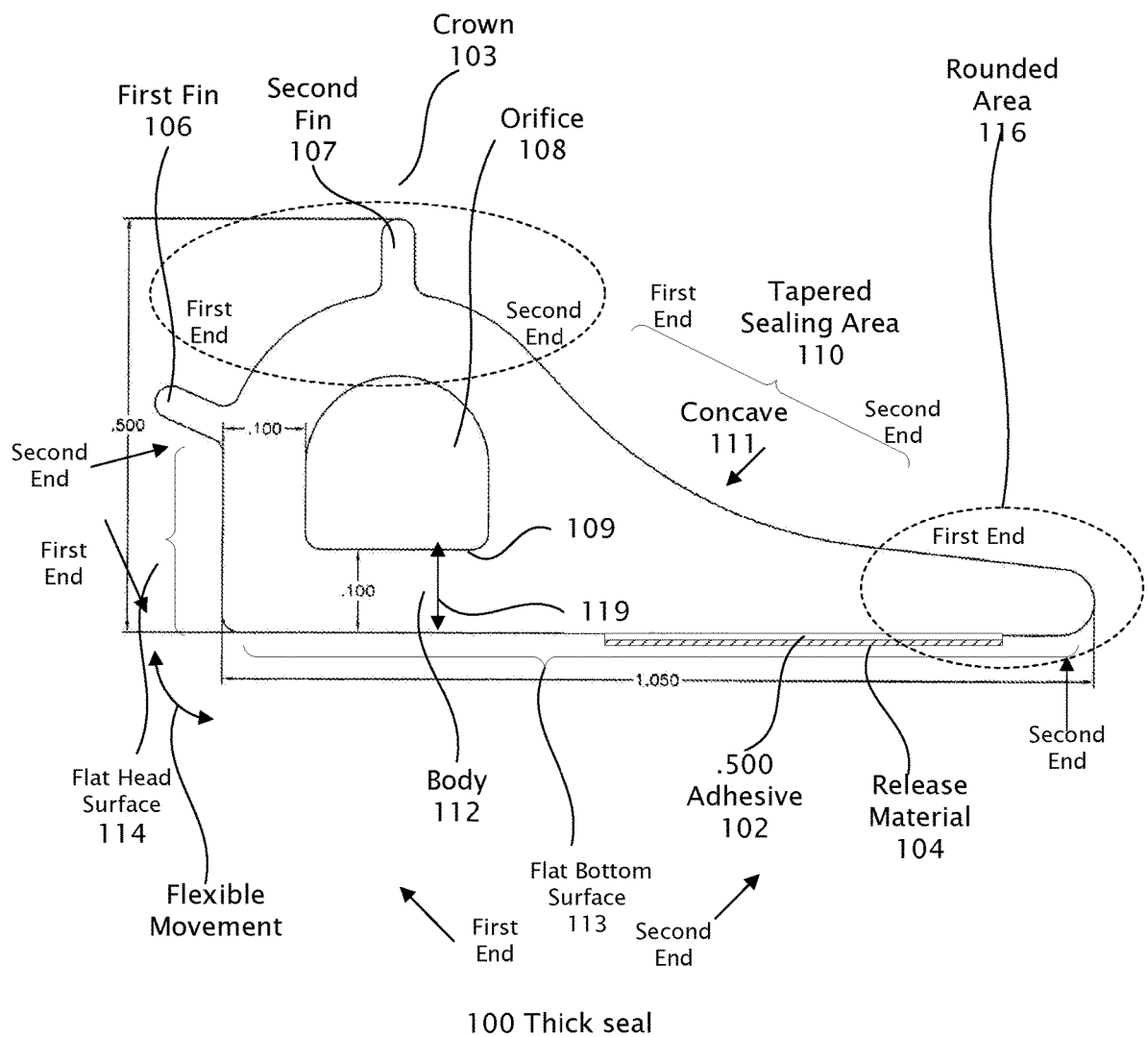
FIG. 1 shows a thick tailgate seal with taper seal.

FIG. 1 shows a cross section of thick tailgate seal with taper seal 100. The tailgate seal is comprised of an elongate body 112 typically made from an elastomer such as silicone, EPDM (ethylene propylene diene monomer) rubber or the like. The seal is typically formed in a long piece with right angle extensions to fit the space between the sides of a tailgate and the longer bottom surface where the hinge may be located.

The body 112 has a tapered sealing area 110 that provides a reduced thickness for improved sealing of gaps of various widths, while allowing for easier closure of the tail gate due to removal of excess material which would cause resistance to closure of the gate. In particular the tapered sealing area has a concave, or dished out surface 111, that advantageously provides an improved seal while reducing the bulk of the seal over those that are not provided with such curvature. Previous seals may have attempted to ease closure by the use of additional voids in the tapered sealing area. However by providing a concave surface the need for such additional voids, which may be subject to breakthrough and rupture with extended use, is removed.

The body 112 also has a hollow orifice 108, which allows compression and recovery of the tailgate seal. The orifice shown has a "D" shape, with the flat of the "D" substantially parallel to a flat bottom surface 113, and with the curved portion of the "D" generally matching the curvature of an exterior crown area 103.

The body includes a flat bottom surface 113 that fits against the truck frame. At a second end there is a rounded area 116 where the concave area of the tapered sealing area abuts the flat bottom surface. Because of the absence of voids this rounded area may be extended out providing more material to maintain the seal. The rounded area has a convex shape as it transitions from the tapered sealing area to the flat bottom surface.

At a first end of the flat bottom surface a first end of the flat head surface 114 is encountered. The flat head surface is generally perpendicular to the flat bottom surface, and extends to a second end of the flat head surface. At the second end of the flat head surface transitions to a first end of a crown area 103. At this juncture a first fin 106 is formed to aid in sealing the gate against the bed surface.

An adhesive strip 102, typically protected by a release material 104 is disposed adjacent to the second end of the flat bottom surface. The adhesive does not extend over the entire flat bottom surface because it has been found that by using substantially 50% coverage the first end of the flat bottom surface may flex during use, providing a better seal.

The crown area 103 is generally convex and includes a second fin 107 that is generally oriented vertically and is located at the peak of the crown. This second fin is substantially oriented at a right angle to the first fin so that seals against two different surfaces (not in the same plane) in the jamb of the tail gate and bed are sealed. It is worth pointing out that the first and second fins seal different areas of the truck body, which is why they are spaced at substantially right angles from each other, and which is why they are not closely spaced together as if they were constructed to seal against a single planar surface.

A second end of the crown area 103 transitions from a convex curve to a concave curve at a first end of the tapered sealing area 110. A second end of the tapered sealing area transitions to the convex curvature encountered at a first end of the rounded area 116, and finally a second end of the rounded area transitions into the second end of the flat bottom surface 113.

Fins 106, 107 are provided to aid the seal gaps between a tailgate and a truck bed differing surfaces (at differing angles). In one example, the seal body 112 has a flat bottom body surface 113 and a flat head surface 114 generally perpendicular to the flat bottom surface 113. The orifice 108 has a flat bottom orifice surface 109 parallel to the surface 113 with a distance 119 between the flat bottom orifice surface 109 and the flat bottom body surface 113. The tapered sealing area 110 comprises a tail section, or rounded area, 116 with a thickness less than the distance 119. In another example, the seal body 112 further includes a plurality of fins 106 extending from the flat head surface 114 and extending upward from the orifice area respectively.

The tailgate seal is provided with a self-adhesive layer 102 on the flat bottom body surface 113 which maintains the tailgate seal in opposition to the truck body. To protect the adhesive, it is covered with a release material 104 which is removed for installation of the tailgate seal. The self-adhesive layer 102 may have various widths. In one example, the self-adhesive layer 102 is only provided within the tapered sealing area 110 for the thick tailgate seal, which allows flexible movement of the tailgate seal around the orifice 108.

Figure 2:
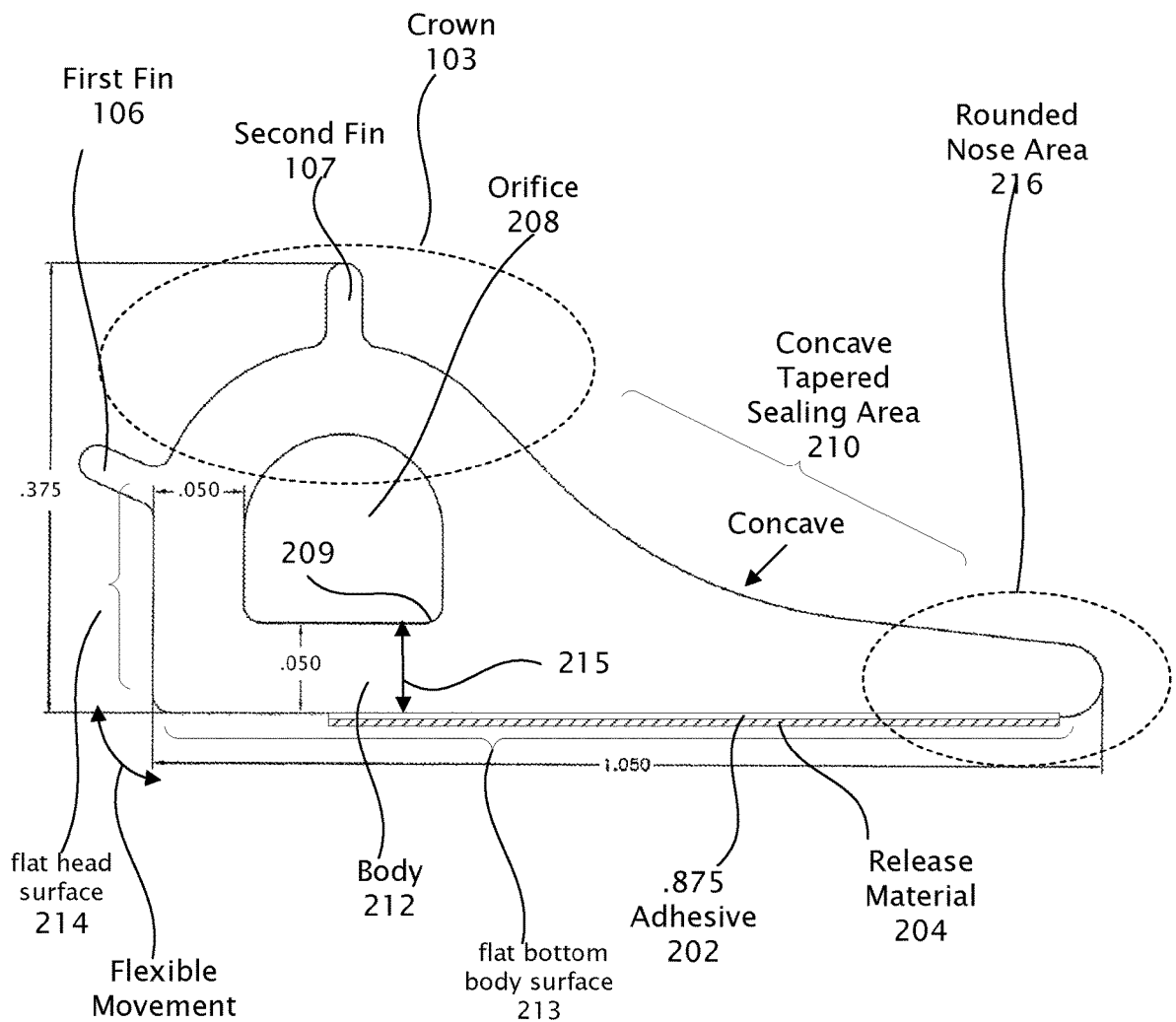
FIG. 2 shows a thin tailgate seal with taper seal.

FIG. 2 shows a cross section of thin tailgate seal with taper seal 200. It is proportioned as described in FIG. 1. The tailgate seal in this figure provides similar attributes as that shown in FIG. 1, but is provided with different dimensions. This thinner tailgate seal 200 is provided with a tapered sealing area 210, an orifice 208, fins 206, a self-adhesive layer 202 covered with a release material 204. Although dimensions are shown in FIG. 1 and FIG. 2, these are meant to be exemplary and not limiting. Those skilled in the art will recognize that the present examples are suitable for application in a variety of different types of orifice or opening sealing applications. The aforementioned mention structure in FIG. 1 may also be applicable to FIG. 2. For example, the seal body 212 has a flat bottom body surface 213 and a flat head surface 214 perpendicular to the flat bottom surface 213. The orifice 208 has a flat bottom orifice surface 209 parallel to the surface 213 with a distance 215 between the flat bottom orifice surface 209 and the flat bottom body surface 213. The tapered sealing area 210 comprises a tail section 216 with a thickness less than the distance 215. In another embodiment, the seal body 212 further comprises a plurality of fins 206 extending from the flat head surface 214 and extending upward from the orifice area respectively. The self-adhesive layer 202 may have various widths. In one embodiment, the self-adhesive layer 202 extends beyond the tapered sealing area 210 to cover at least some of the flat bottom body surface 213 in proximity of the orifice 208.

Figure 3:
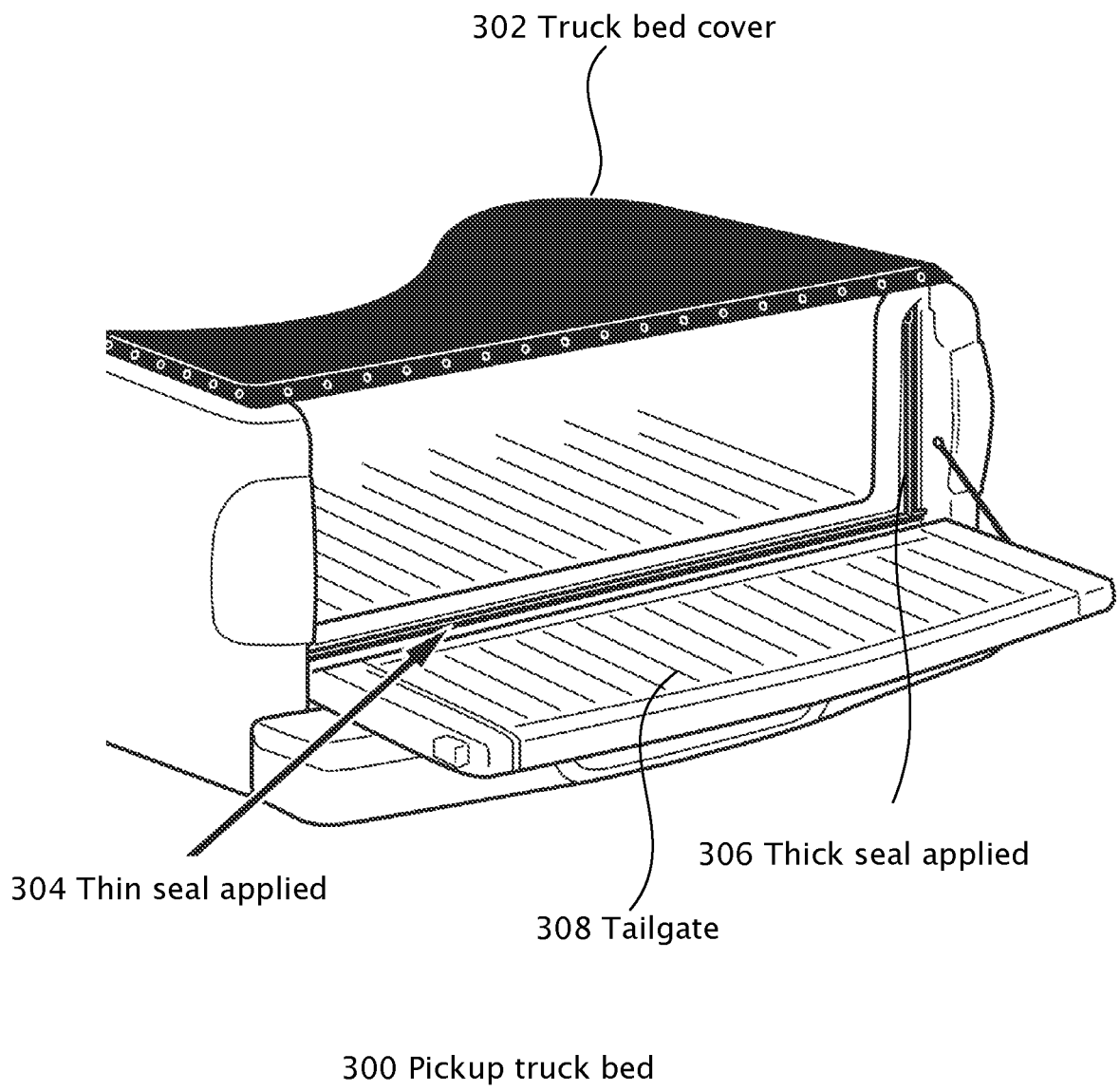
FIG. 3 shows a pickup truck bed with the thick and thin seal applied.

FIG. 3 shows a pickup truck bed with the seal applied. The tailgate seal 304 and 306 is applied to the three sides of the pickup truck bed where the tailgate 308 meets the truck bed. When the tailgate 308 is closed, the tailgate seal 304 and 306 seal any gap between the tailgate 308 and truck bed. In one embodiment, the tailgate seal 304 and 306 have the same dimension. In another embodiment, the tailgate seal 304 and 306 have different dimensions.

Figure 4:
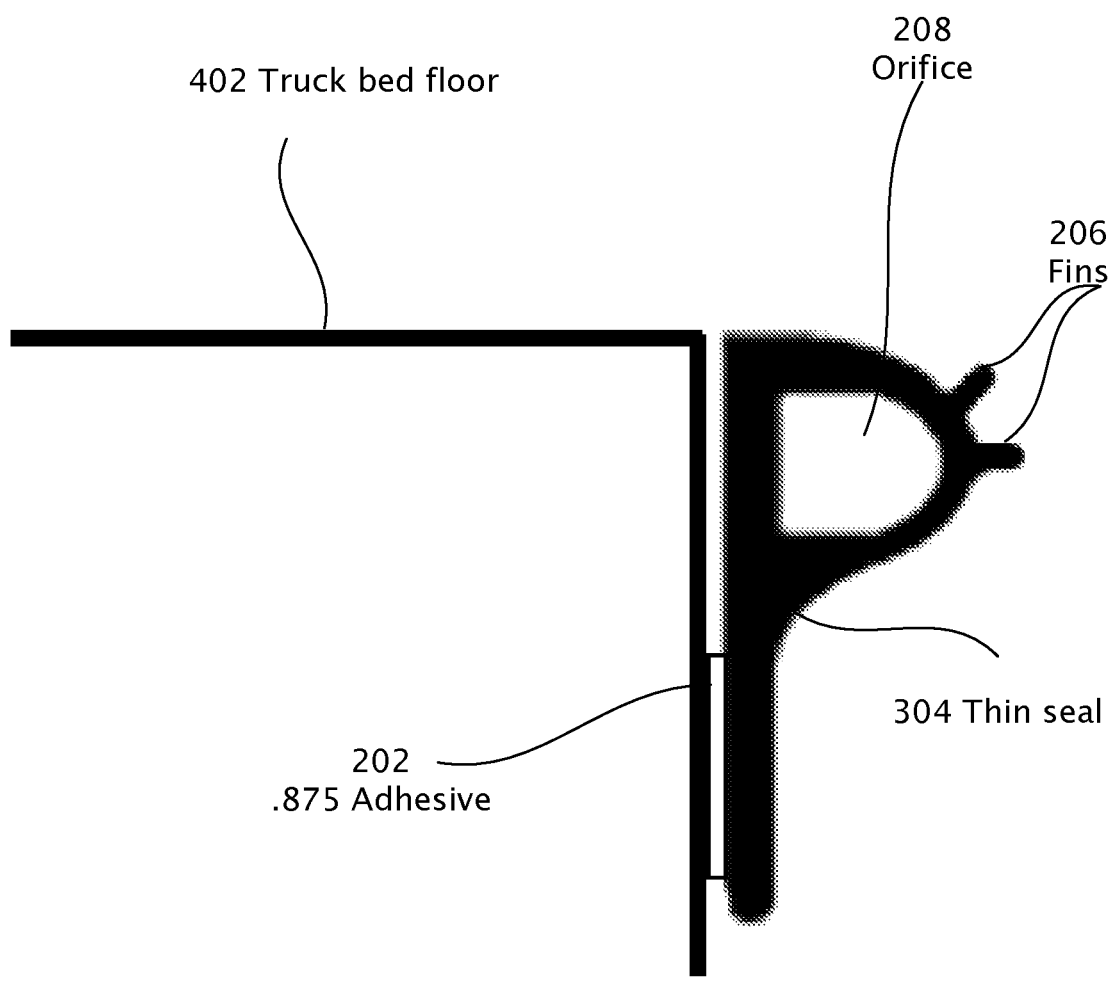
FIG. 4 shows the thin seal applied at the truck bed floor.

FIG. 4 shows the thin seal applied at the truck bed floor. The tailgate seal 304 is applied at the edge of the truck bed floor with the edge of the tailgate seal with the orifice 208 and fins 206 closest to the truck bed floor. In one embodiment, the flat head surface 214 is flush with truck bed floor surface 402 for a flat surface. Although the thin seal applied at the truck bed floor as shown I FIG. 4, it is understood that the thick seal may also be applied at the truck bed floor.

Figure 5:
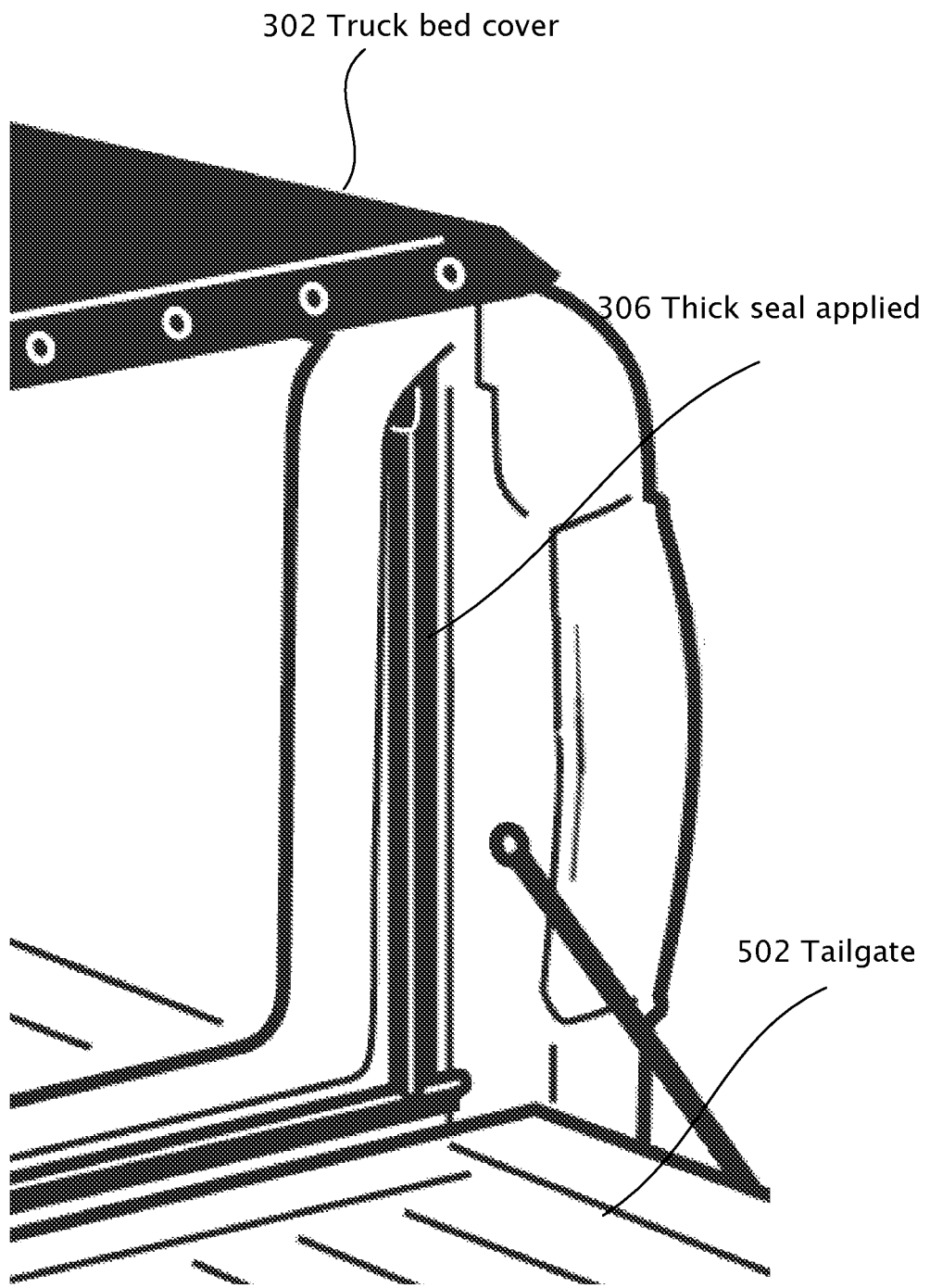
FIG. 5 shows the thick seal applied at the sides of the truck bed.

FIG. 5 shows the thick seal 306 applied at the sides of the truck bed. The application is similar to that shown in FIG. 4 in that the orifice and fins (not shown) are placed closest to the truck bed opening.

Figure 6:
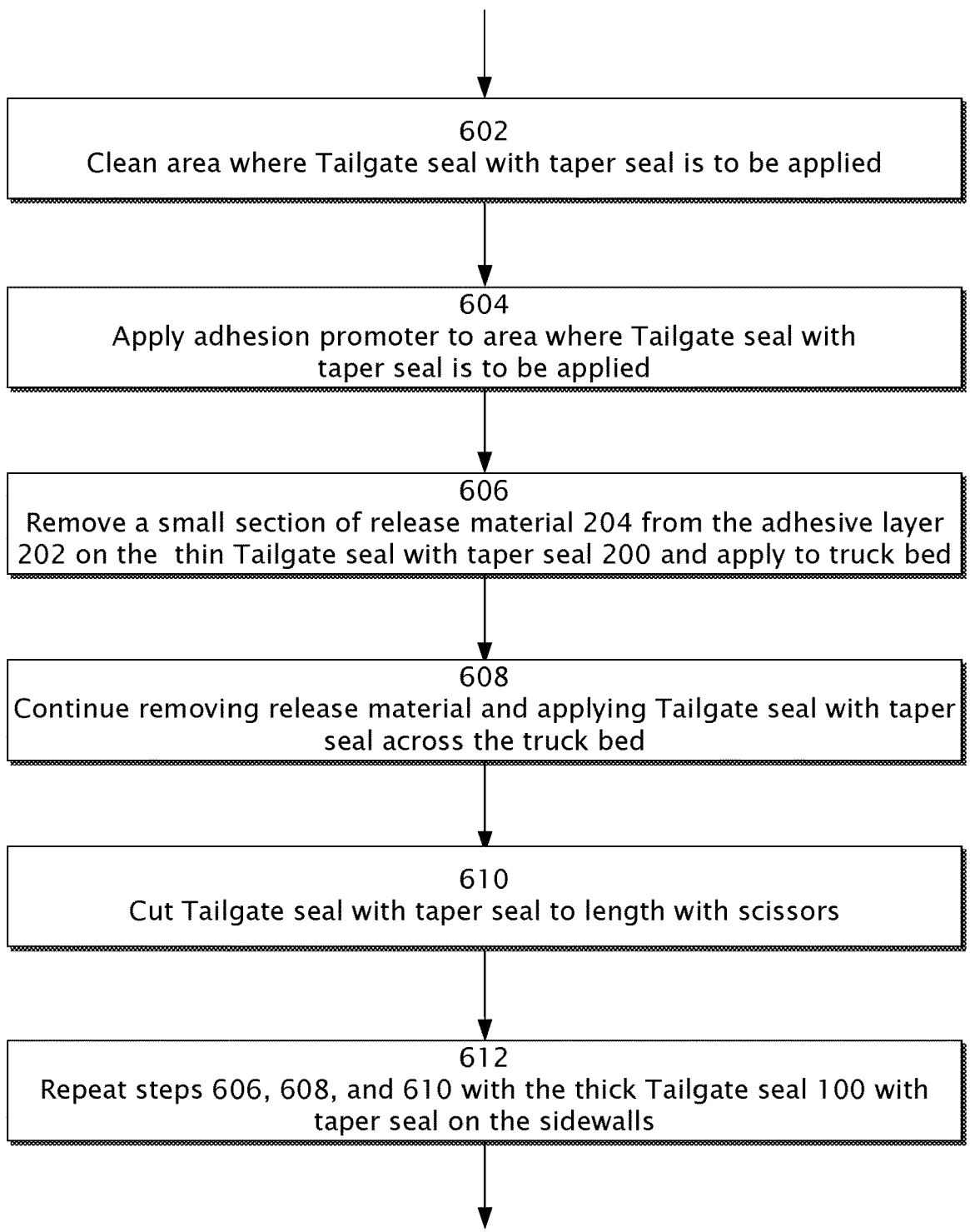
FIG. 6 shows a flow diagram outlining the installation of the tailgate seals with taper seal.

FIG. 6 shows a flow diagram outlining the installation of the tailgate seals with taper seal. At block 602, the area where the tailgate seal with taper seal 100 and 200 are to be applied is cleaned with soap and water and dried. Once dry, the areas are cleaned with isopropyl alcohol and allowed to dry. At block 604, an adhesion promoter may optionally be applied to the areas where the tailgate seal with taper seal is applied. An adhesion promoter is typically not needed for a painted surface, but may help when installing a tailgate seal to a spray liner. At block 606, a small portion of the release material 204 is removed from the adhesive 202 and the tailgate seal applied to the truck bed starting at one end. At block 608, the process of removing a small section of release material from the adhesive layer is continued across the floor of the truck bed. At block 610, the tailgate seal is cut with scissors.

At block 612, the tailgate seal 100 is applied to the sides of the tailgate opening, beginning at the bottom of the opening, progressing up the side wall to the top of the opening, then cutting the tailgate seal with scissors to fit. This block is repeated on the opposite side of the tailgate opening.

Figure 7:
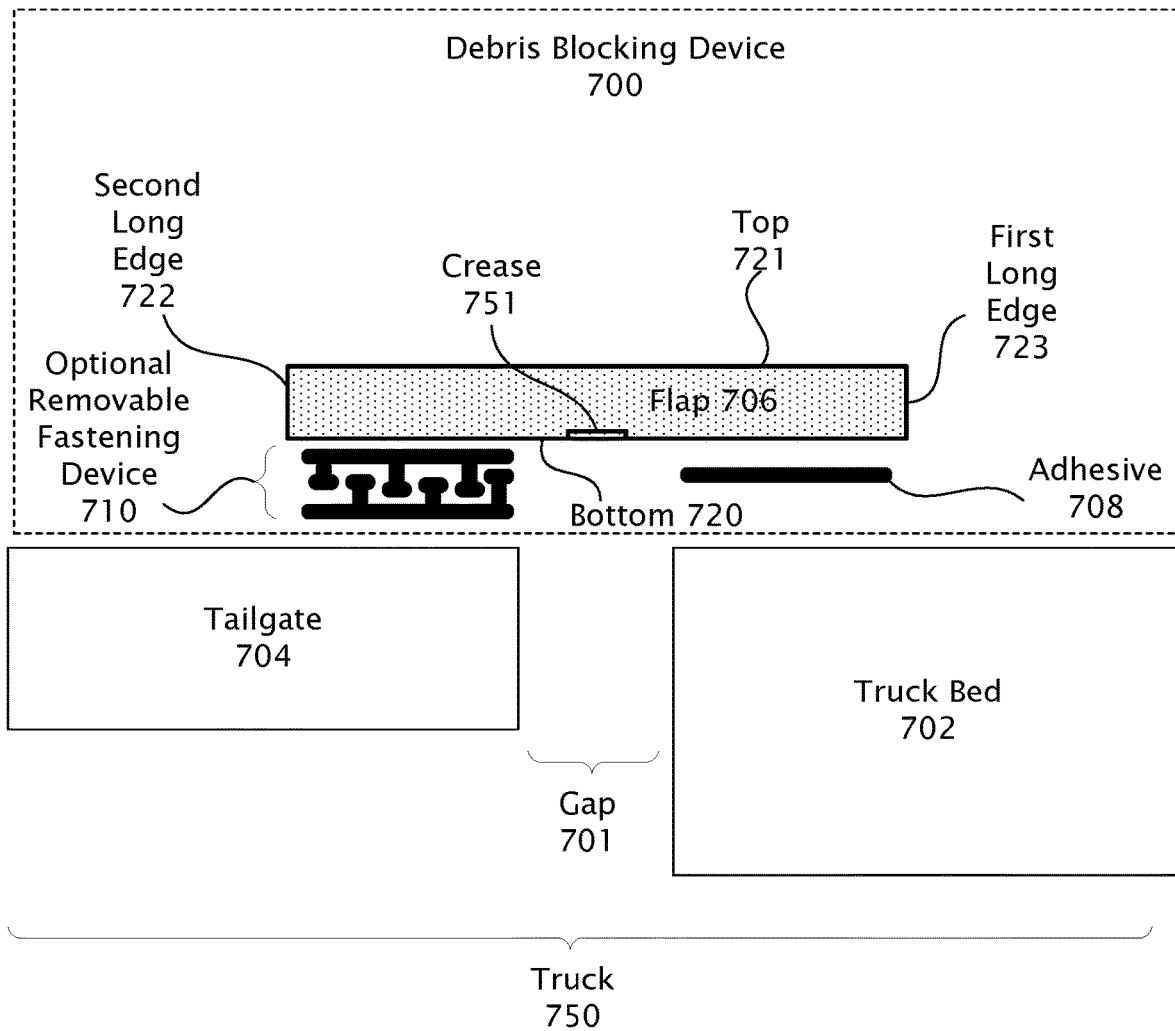
FIG. 7 is a side cut away view showing debris blocking device installed on a pickup truck.

FIG. 7 is a side, or cut away view showing a debris blocking device installed on a pickup truck. The debris blocking device 700 includes a flap 706, a removable fastening device 710 and an adhesive 708. Adhesive surfaces to be exposed upon instillation may be covered with conventional quick release tape (not shown) to prevent attachment to undesired objects.

Flap 706 is typically a flexible elongate member that extends between opposing side walls of the truck bed and wide enough to bridge the gap 701 between the tailgate 704 and the bed 702. The flap 706 is typically 62×4.2×0.1 inches, 62×7.0×0.1 inches, or equivalent in overall dimensions. It may be supplied in a roll of any convenient length. The flap 706 material may be made from EPDM rubber or its equivalent, which allows the flap to conform to irregularities in the bed and the tailgate. A medial longitudinal crease 751 may be included in the flap to aid in folding when the tailgate is raised.

Typical irregularities include the ridges in a bed and tailgate, as well as various other ridges, valleys that may be present in various models of pickup trucks, or cargo boxes. The material selected and the design of the debris blocking device 700 using flexible components 706, 710, 708 allow the debris blocking device to fit on a large variety of truck beds and tailgates having a variety of surface irregularities.

The simplified design by the selection of appropriate materials and construction of the debris blocking device allows an elegant and cost effective solution to sealing the gap between a tail gate and a truck bed without the need for metal semi-rigid strips, brackets or the like. It is worth noting that such semi-rigid strips or brackets would have to be pre-molded or otherwise formed to conform to the imperfections previously noted which would require a number of strips for each truck model. Alternatively a flat semi-rigid strip would not seat well against the bed, or gate, allowing debris to get into gaps between such brackets and the gate or bed caused by the ridges. The debris blocking device described herein eliminates this problem.

It is worth noting that the debris blocking device 700 is directly attached to the truck bed 702 and tailgate 704, with adhesive and without metallic or semi-rigid mounting rails channels, mounting rails or the like between the flap and the tailgate and or bed. Also, the debris blocking device 700 attaches advantageously to the bed and tailgate without the need for hardware such as fasteners, screws, rivets or the like, and without the need to create holes in the tailgate or bed to accommodate the fasteners. Attachment of the debris blocking device to the gate and bed is accomplished with adhesive, or adhesive tape. If removal is desired the tape/adhesive may be removed easily, leaving an unmarked (without holes) tailgate and or truck bed. Further as previously mentioned, the resilient material of the flap 706 conforms to irregularities in the bed and tailgate to create an improved seal. An exemplary adhesive is 3M™ brand ST1200 tape or equivalent.

Adhesive 707 is used to couple the debris blocking device to the truck. Towards the first long edge 723 of the flap 706, an adhesive 710 is disposed on a bottom side 720 of the flap 706. Before instillation the adhesive 708 may be covered with a quick release tape (not shown) to protect the adhesive until installed.

Alternatively the adhesive 708 may be in the form of double sided tape that has a first side pre-attached to the flap 706 and a second side attached to the truck at instillation. The width of the adhesive is typically chosen so that sufficient contact is made with the truck bed to hold the flap in place, and not so wide that the adhesive protrudes into the gap 701 an exemplary tape is 3M™ ST1200 double sided tape or equivalent.

In the example shown an optional removable fastening device 710 may be attached to the flap 706 along the second long edge with adhesive as described above.

In a further alternative example adhesive (or double sided tape) may be disposed along the second long edge 722 as previously described for the adhesive 708 disposed along the first long edge, omitting the removable fastening device for a more permanent instillation.

A removable fastening device 710 may optionally be disposed along the second long edge 722 of the flap 706 to couple the flap to the tailgate 704. The removable fastening device 710 disposed on the bottom side 720 of the flap 706. The fastening device 710 typically includes two halves that are removably coupled to each other on facing sides and with the two outer sides each adhesively attached to the gate and flap respectively The removable fastening device 710 typically couples the flap to the tail gate 704, and allows the tail gate 704 to be removed by disengaging the two halves of the fastening device 710 that are removably coupled together.

Removable coupling of the two halves of the optional removable fastening device may be with the use of mushroom posts, hook and loop, snaps, or the like. One strip attaches to the flap 706, and the other mating strip that attaches to the tailgate (or bed). Adhesive on the outer surfaces of the removable fastening device may be provided with a release strip or paper over the adhesive that attaches the removable fastening device to the truck.

In particular VELCRO™ Brand ALFA-LOK™ removable tape may be used in an example of the removable fastening device 710. VELCRO™ Brand ALFA-LOK™ functions like hook and loop tape but tends to be more rugged and waterproof, tending not to lose holding strength when wet. Unlike hook and loop tape VELCRO™ Brand ALFA-LOK™ tape utilizes a base with flexible vertical posts protruding from the base. Each post has a protruding or nail shaped head. When mating strips are pressed together the nail heads interlock to keep the two pieces joined together.

The debris blocking device 700 may be used in conjunction with a tail gate seal (100 of FIG. 1) to prevent the intrusion of moisture, dirt and the like in the bed area, in particular when a shell, tonneau cover or the like is used to cover the truck bed. In particular the blocking device 700 may be used to seal the bed to the gate, and the tail gate seal (100 of FIG. 1) used to seal the box sides to the tailgate. The blocking device 700, and the tail gate seal (100 of FIG. 1) may be sold as separate part assemblies or together as a kit, with sufficient length to allow the flap to be cut to fit a given bed-allowing for further universality of the blocking device. Optionally in a combination kit the horizontal portion of a tailgate seal between the tailgate and the truck bed may also be installed if desired to increase sealing over that provided by the blocking device. A suitable tail gate seal is described in TAILGATE SEAL FOR A PICKUP WITH A TRUCK CAP OR COVER, U.S. Pat. No. 10,099,544 issued Oct. 16, 2018, the contents of which are hereby incorporated by reference.

The flap 706 is made from flexible and resilient material to allow it to flex when the tail gate is raised. Rubber or the like may be used for the flap. The flap is of sufficient thickness to withstand use, typically a uniform thickness of approximately 0.1 inches for a rubber flap. Also the flap is typically flexible enough to conform to ridges and irregularities in the truck bed and gate so that gaps are not present in which debris might accumulate, or escape. Although shown as rectangular other shapes are contemplates such as those having a one or more tapered edges, longitudinal ridges, thicker in one area, or let out in a given area to accommodate flexing, or the like.

The adhesives 708 used to attach the flap to the bed and the removable tape strips to the flap and the tail gate typically adheres to metal and surface finishes (paint), including spray on bed liners, using integrated 3M brand ST1200 tape, or the like. Use of an activator or a primer to aid in adhesion may be desired.

Accordingly when it is desired to remove the tailgate the flap end with the adhesive backed fastening tape is pulled away so the tail gate can be removed. When the tail gate is replaced the flap is folded back over the tailgate and the two tape pieces pressed together so that the nail heads catch on each other to couple the flap 706 to the tailgate 704 via the adhesive tape.

FIGS. 8-12 show various views of the debris blocking device installed in a pickup truck box and tailgate.

Figure 8:
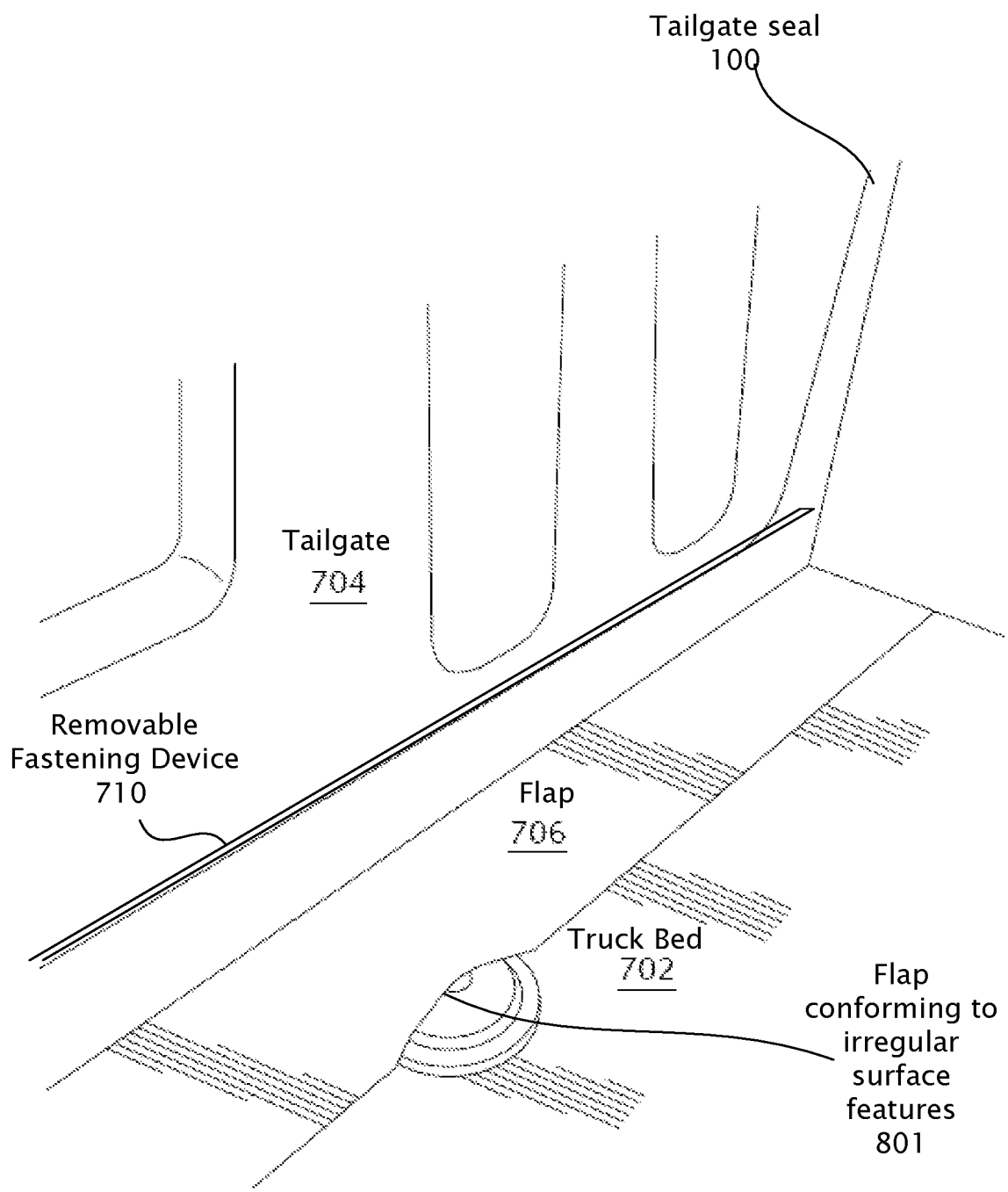
FIG. 8 shows the debris blocking device installed in a truck bed with the tail gate raised.

FIG. 8 shows the debris blocking device installed in a truck bed with the tail gate raised. The flap material 706 easily conforms to irregularities in the truck bed 801 as can be seen in this case a bolt and washer. The edge of the removable fastening device 701 may be seen attached to the tailgate in this example. The flexibility of the removable fastening device may also advantageously conform to irregularities in the tail bate 704. A tailgate seal 100 (or alternatively tailgate seal 200 of FIG. 2) may also be present sealing the tailgate 704 against the truck bed 702. The tailgate seal may end at the flap material 706, or for more sealing the tailgate seal may continue underneath the flap 706 between the tailgate and bed. When the gate is raised the flap 706 tends to fold into the gap between the gate and the bed forming an additional seal against the intrusion of dirt, dust and the like into the bed area.

Figure 9:
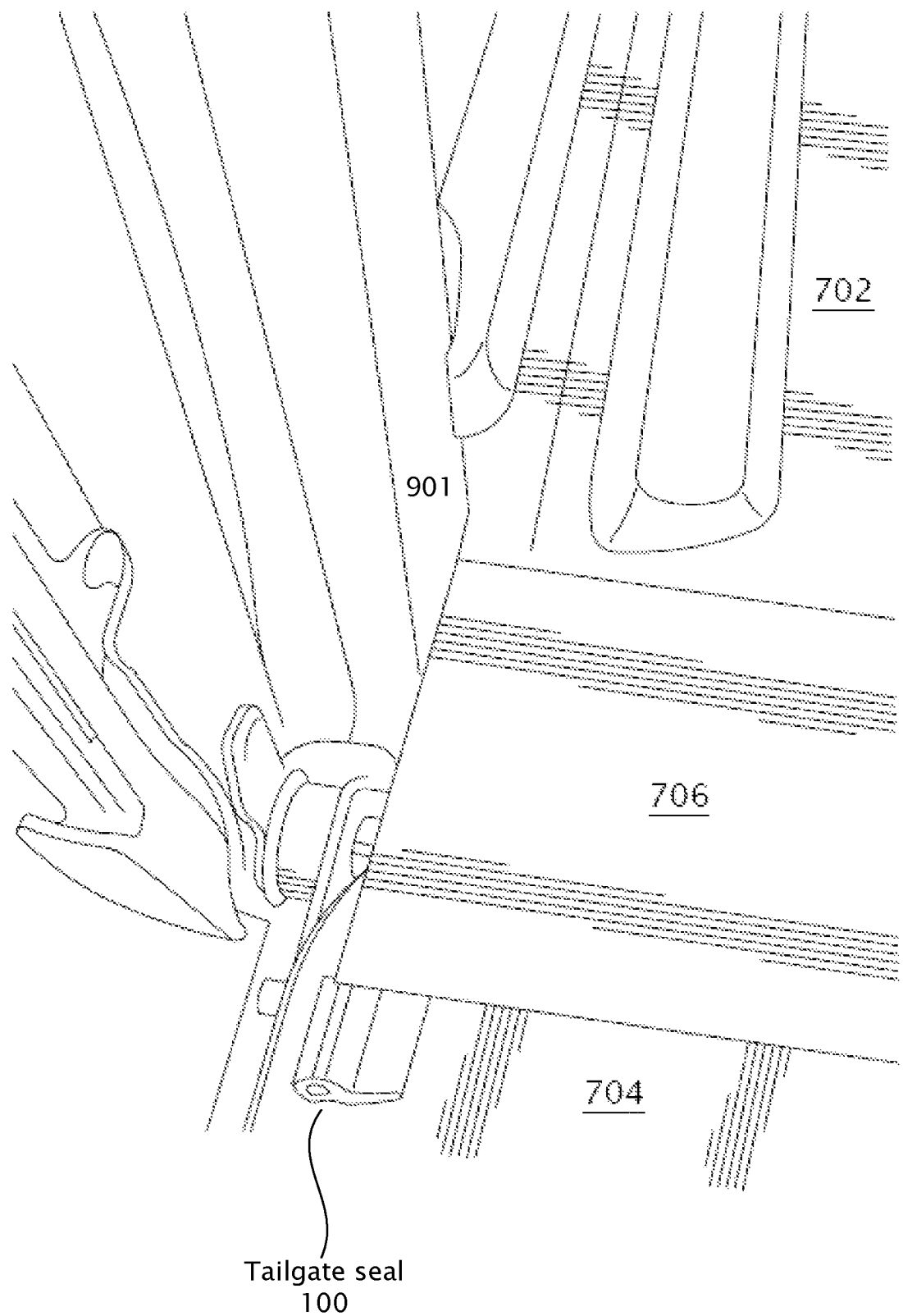
FIG. 9 shows the debris blocking device installed in a truck bed with the tail gate lowered.

FIG. 9 shows the debris blocking device installed in a truck bed 702 with the tail gate 704 lowered. In this example the tailgate seal 100 is installed showing the orientation of the taper as pointing to the center of the tailgate 704. The flap material extends to the edge of the bod wall 901.

Figure 10:
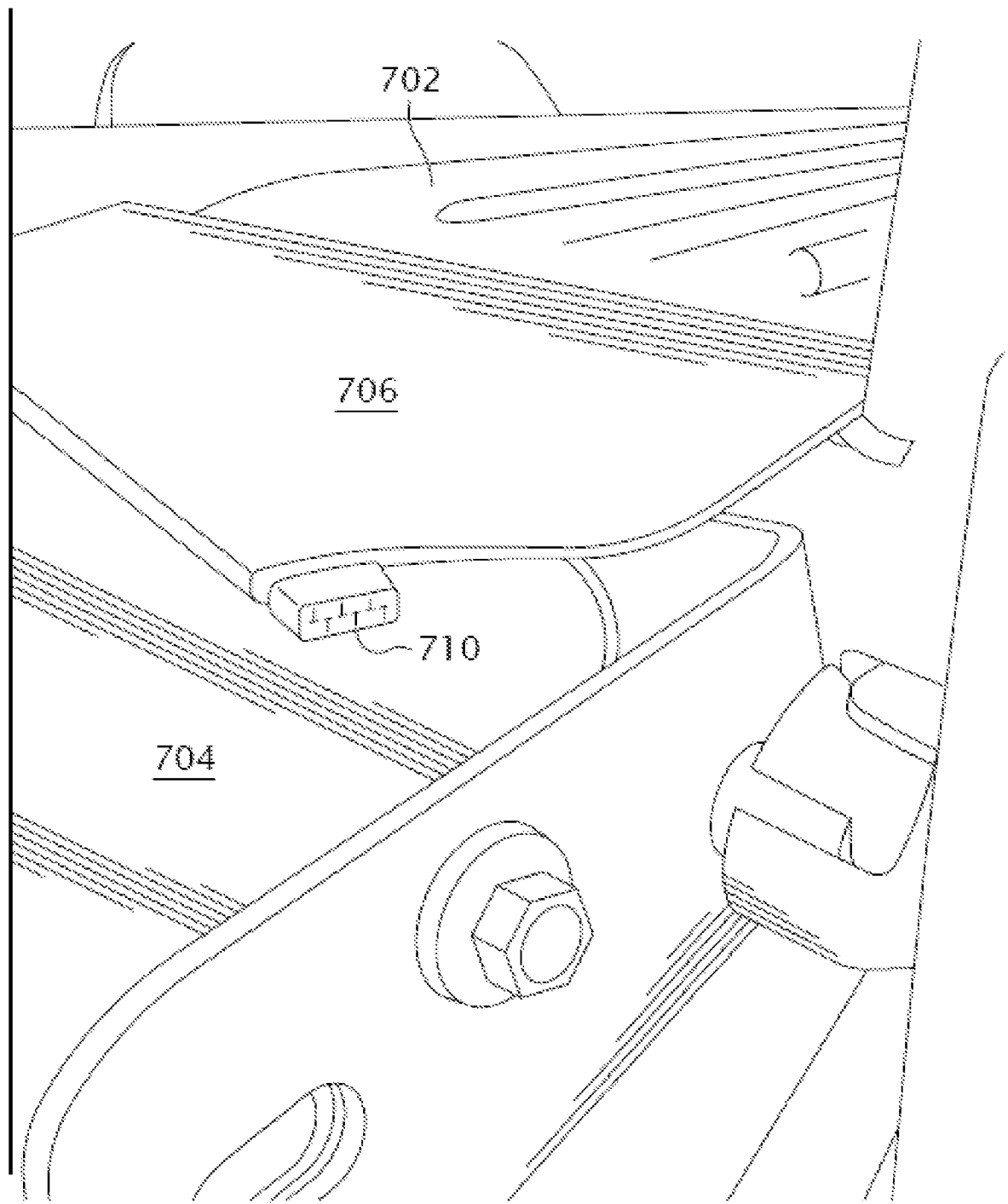
FIG. 10 shows the debris blocking device installed in a truck bed with the tail gate lowered and the removable coupling to the tail gate.

FIG. 10 shows the debris blocking device installed in a truck bed 702 with the tail gate lowered and removable coupling to the tail gate via the removable fastening device 710 on the flap 706 just prior to installation by attaching the removable fastening device to the tailgate 704.

Figure 11:
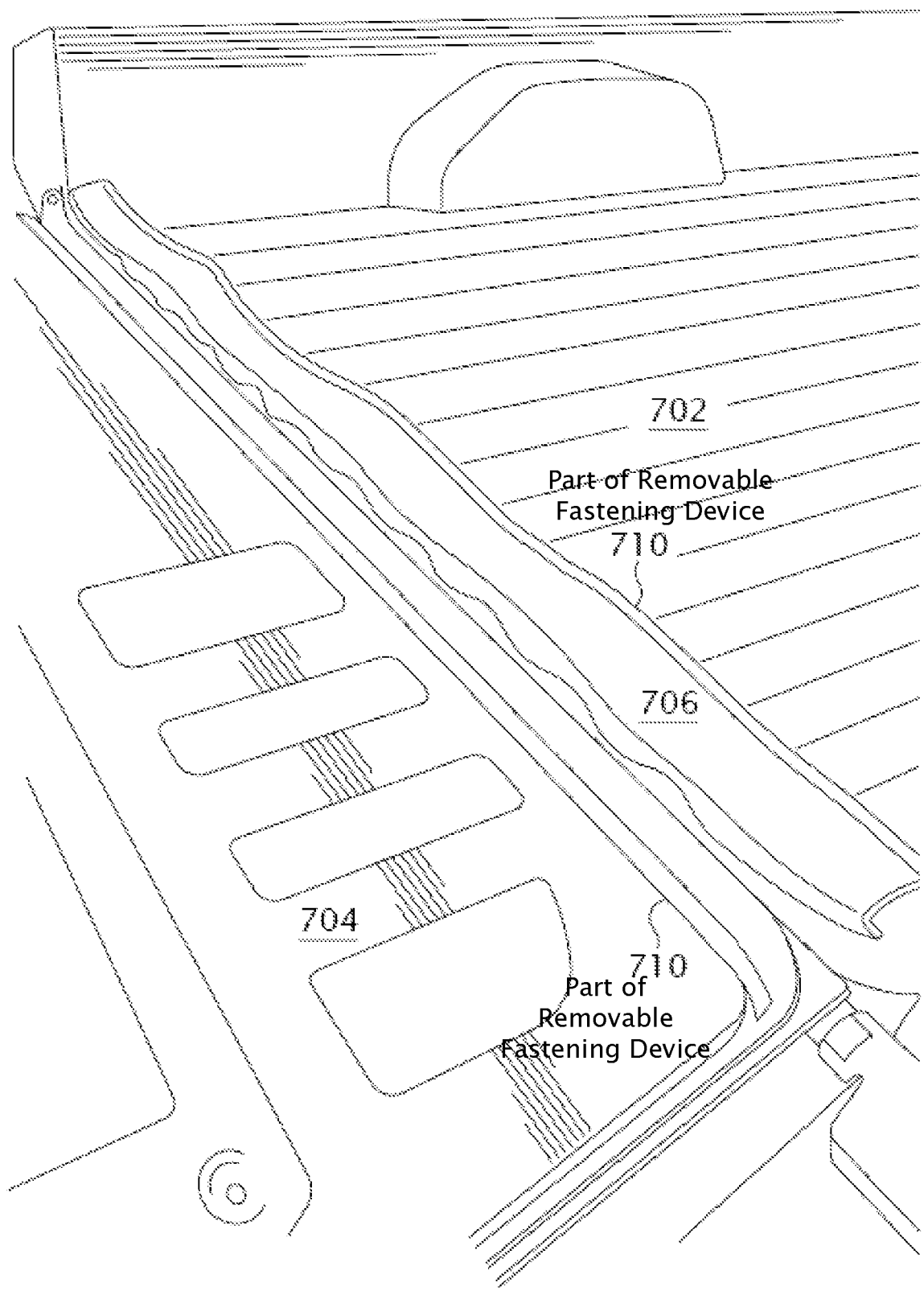
FIG. 11 shows the debris blocking device installed in a truck bed with the tail gate lowered and with the blocking device disengaged from its mating tape strip prior to removing the tail gate.

FIG. 11 shows the debris blocking device installed in a truck bed 702 with the tail gate 704 lowered and with the blocking device 710 disengaged into its two halves prior to removing the tail gate 704. The flap material 706 has been folded over just prior to removing the tailgate 704. Leaving the flap 706 attached to the bed may provide a degree of protection to the edge of the bed. As previously mentioned and described the orientation of the debris blocking device may be swapped from that shown in FIGS. 8-11, with the removable fastening device being attached to the bed rather than the tailgate.

Figure 12:
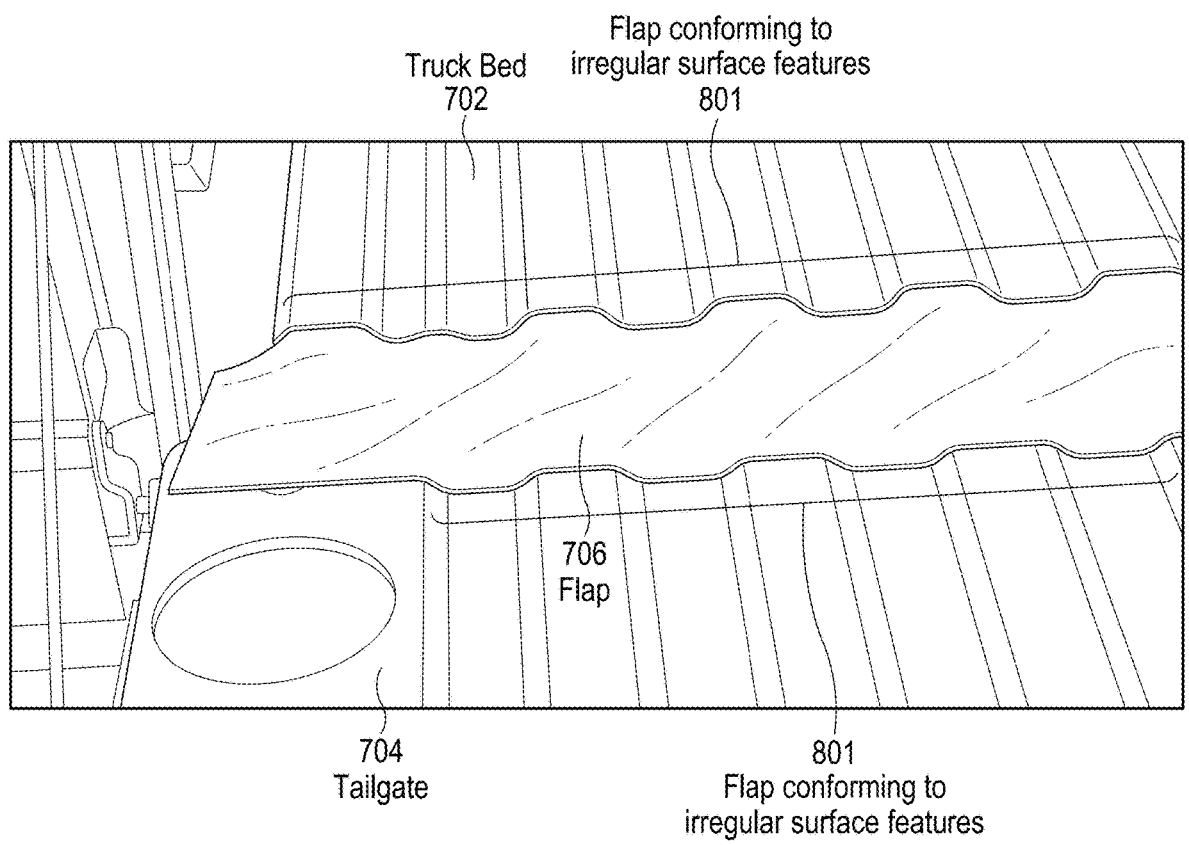
FIG. 12 shows the debris blocking device installed in a truck bed with the tail gate lowered with the flap conforming to irregularities in the bed and tailgate.

FIG. 12 shows the debris blocking device installed in a truck bed 702 with the tail gate 704 lowered with the flap 706 conforming to irregularities in the bed and tailgate and bed 801. The flexibility of the flap 706, the adhesive (not shown) and the removable fastening device (not shown) allow for an improved seal due to the flexibility of the materials.

It will be obvious to those skilled in the art to make various changes, alterations and modifications to the invention described herein. To the extent such changes, alterations and modifications do not depart from the spirit and scope of the appended claims; they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A debris blocking device comprising:
   an adhesive;
   a first adhesive backed fastening tape having a first side and a second side;
   a second adhesive backed fastening tape having a first side and a second side;
   an elongate flat elastic flap having a bottom surface having a first long edge and a second long edge, the elongate flat elastic flap sized to extend over a gap between an edge of a truck bed and a tailgate and a thickness chosen to allow the elongate flat elastic flap to conform to irregularities in a surface contacted by the elongate flat elastic flap, with the first adhesive backed fastening tape disposed along the first long edge of the elongate flat elastic flap, and the second adhesive backed fastening tape disposed along the second long edge of the elongate flat elastic flap,
   whereby the debris blocking device is installed in a pickup truck bed between the bed and the tailgate further comprising a tailgate seal disposed in a gap between the tailgate and the bed, the tailgate and a right bedside, and the tailgate and a left bedside, in which the tailgate seal comprises: a seal body with an outer surface including: a flat bottom body surface, having a first end and a second end; a flat head surface having a first end and a second end, and including a first fin of non-perpendicular orientation, the flat head surface perpendicular to the flat bottom body surface where the first end of the flat head surface abuts the first end of the flat bottom surface, and the first fin of non-perpendicular orientation disposed along the flat head surface at the second end of the flat head surface; a crown section having a first end and a second end, and including a second fin extending vertically from a peak of the crown section, the first end of the crown section abutting the first fin of non-perpendicular orientation and the second end of the flat head surface; a tapered sealing area including a first end and a second end, and including a concave surface extending between the tapered sealing area first and second ends, the tapered sealing area first end abutting the second end of the crown section; and a rounded area having a first end and a second end, the second end of the tapered sealing area abutting the first end of the rounded area, and second end of the rounded area abutting the second end of the flat bottom surface, whereby the tapered sealing area provides a non-linear varied thickness from the second end of the crown to the first end of the rounded area; a single "D" shaped orifice disposed within the seal body, having a flat side of the "D" shape orientated parallel to the flat bottom body surface; and an adhesive layer disposed on the flat bottom body surface for coupling the seal body to a truck body.

2. An assembly comprising:
a debris blocking device including:
  an adhesive;
  a first adhesive backed fastening tape having a first side and a second side;
  a second adhesive backed fastening tape having a first side and a second side;
  an elongate flat elastic flap having a bottom surface having a first long edge and a second long edge, the elongate flat elastic flap sized to extend over a gap between an edge of a truck bed and a tailgate and a thickness chosen to allow the elongate flat elastic flap to conform to irregularities in a surface contacted by the elongate flat elastic flap, with the first adhesive backed fastening tape disposed along the first long edge of the elongate flat elastic flap, and the second adhesive backed fastening tape disposed along the second long edge of the elongate flat elastic flap; and
a tailgate seal including;
  a seal body with an outer surface including:
    a flat bottom body surface, having a first end and a second end;
    a flat head surface having a first end and a second end, and including a first fin of non-perpendicular orientation, the flat head surface perpendicular to the flat bottom body surface where the first end of the flat head surface abuts the first end of the flat bottom surface, and the first fin of non-perpendicular orientation disposed along the flat head surface at the second end of the flat head surface;
    a crown section having a first end and a second end, and including a second fin extending vertically from a peak of the crown section, the first end of the crown section abutting the first fin of non-perpendicular orientation and the second end of the flat head surface;
    a tapered sealing area including a first end and a second end, and including a concave surface extending between the tapered sealing area first and second ends, the tapered sealing area first end abutting the second end of the crown section; and
    a rounded area having a first end and a second end, the second end of the tapered sealing area abutting the first end of the rounded area, and second end of the rounded area abutting the second end of the flat bottom surface, whereby the tapered sealing area provides a non-linear varied thickness from the second end of the crown to the first end of the rounded area;
    a single "D" shaped orifice disposed within the seal body, having a flat side of the "D" shape orientated parallel to the flat bottom body surface; and
    an adhesive layer disposed on the flat bottom body surface for coupling the seal body to a truck body; and
  whereby the debris blocking device is installed in a pickup truck bed between the bed and the tailgate and the taper seal is installed around a perimeter of an opening in the truck bed contacting a perimeter of the tailgate.

3. The assembly of claim 2 further comprising a removable fastening device attached to the second adhesive backed fastening tape.

4. The assembly of claim 2 in which the tailgate seal is disposed in the gap between the tailgate and the bed, the tailgate and a right bedside, and the tailgate and a left bedside.

5. The assembly of claim 2 in which the first and second adhesive backed fastening tape further comprise a release strip.

6. The assembly of claim 2 in which the elongate flap is made from flexible material so that the elongate flap folds from an open position with the tailgate down to a right angle bend with excess material extending below the gap when the tail gate is closed.

7. The assembly of claim 2 in which the elongate flat elastic flap is made from EPDM rubber.

8. The assembly of claim 2 in which the elongate flat elastic flap includes a medial longitudinal crease to aid in closing when the tailgate is raised.

9. The assembly of claim 2 in which a thickness of the elongate flat elastic flap is chosen to seal the elongate flat elastic flap against irregular surfaces.

* * * * *